US012454662B2

(12) United States Patent
Ferry

(10) Patent No.: US 12,454,662 B2
(45) Date of Patent: Oct. 28, 2025

(54) METHOD OF EXTENDING THE OLFACTORY EFFECT OF A FRAGRANCE COMPOSITION

(71) Applicant: GIVAUDAN SA, Vernier (CH)

(72) Inventor: Aurelie Ferry, Bouffémont (FR)

(73) Assignee: GIVAUDAN SA, Vernier (CH)

( * ) Notice: Subject to any disclaimer, the term of this patent is extended or adjusted under 35 U.S.C. 154(b) by 0 days.

(21) Appl. No.: 18/678,774

(22) Filed: May 30, 2024

(65) Prior Publication Data

US 2024/0309299 A1 Sep. 19, 2024

Related U.S. Application Data

(63) Continuation of application No. 17/298,405, filed as application No. PCT/EP2018/085157 on Dec. 17, 2018, now Pat. No. 12,024,692.

(51) Int. Cl.

| | |
|---|---|
| ***C11D 3/50*** | (2006.01) |
| ***C11B 9/00*** | (2006.01) |
| ***C11D 3/00*** | (2006.01) |

(52) U.S. Cl.

CPC .............. *C11D 3/50* (2013.01); *C11B 9/0019* (2013.01); *C11B 9/0034* (2013.01); *C11B 9/0061* (2013.01); *C11D 3/001* (2013.01)

(58) Field of Classification Search

CPC ....... C11D 3/0068; C11D 3/2072; C11D 3/50; C11D 3/507; C11D 7/50; C11D 9/44; C11D 9/442; C11D 2111/12

See application file for complete search history.

(56) References Cited

U.S. PATENT DOCUMENTS

2010/0331225 A1* 12/2010 Panandiker ............ C11D 3/505 510/516
2013/0316938 A1* 11/2013 Baumgartner ........ C11B 9/0003 585/24
2013/0324450 A1* 12/2013 Reichlin .................. C11D 3/50 510/103
2014/0323383 A1* 10/2014 Trujillo ................ C11D 17/043 510/439
2015/0141309 A1* 5/2015 Vaes ...................... C11D 1/645 510/516
2016/0122271 A1* 5/2016 Indradas ............... C11B 9/0061 568/426
2019/0161702 A1* 5/2019 Saveyn ................ C11D 3/2093

FOREIGN PATENT DOCUMENTS

WO 2007143873 A1 12/2007
WO 2008154765 A1 12/2008
WO 2012085287 A1 6/2012
WO 2015086522 A1 6/2015
WO 2018096176 * 5/2018
WO 2018096176 A1 5/2018

OTHER PUBLICATIONS

International Search Report for Application No. PCT/EP2018/085157 dated Jul. 23, 2019.
Written Opinion for Application No. PCT/EP2018/085157 dated Jul. 23, 2019.
J.R. Stephens, et al., "New Compounds. Certain n-Dodecyl Sulfides", Journal of the American Chemical Society, vol. 73, No. 8, Jan. 1, 1951.

* cited by examiner

*Primary Examiner* — Charles I Boyer
(74) *Attorney, Agent, or Firm* — Curatolo Sidoti & Trillis Co., LPA; Floyd Trillis, III; Salvatore A. Sidoti

(57) ABSTRACT

A method of extending the olfactory effect of a fragrance added to a washed item, comprising the addition to the wash of the fragrance, the fragrance comprising at least one compound selected from the group consisting of ethyl (Z)-2-acetyl-4-methyltridec-2-enoate; ethyl N,S-bis(4-oxo-4-(2,6,6-trimethylcyclohex-3-en-1-yl)butan-2-yl)cysteinate; 4-(dodecylthio)-4-methylpentan-2-one; 1-butoxy-3-((1E,4Z)-hepta-1,4-dien-1-yl)benzene; and 2-ethoxy-4-((1E,4Z)-hepta-1,4-dien-1-yl)phenol. A washed item in which the washing utilized at least one of the compounds and which was then stored, for example, in a cupboard, closet or drawer, is found to have retained a substantial proportion of the fragrance, and for a longer time.

4 Claims, No Drawings

METHOD OF EXTENDING THE OLFACTORY EFFECT OF A FRAGRANCE COMPOSITION

CROSS REFERENCE TO RELATED APPLICATIONS

This application is a continuation application of U.S. application Ser. No. 17/298,405, filed May 28, 2021, which is a national stage application of International Application No. PCT/EP2018/085157, filed 17 Dec. 2018, which applications are incorporated herein by reference in their entireties.

This disclosure relates to fragrance formulations and more particularly to a means of extending the olfactory effect of such fragrances.

Fragrance is a common additive to clothes washes, either as a fragrant rinse, or as a component of a washing preparation such as a detergent composition or a fabric softener. The odour of the fragrance is generally evident after the wash is completed and even after drying and storing in an enclosed, openable storage space, such as a drawer, cupboard or closet. On initial storage, the fragrance is still evident for a short time when the space is opened, but this generally fades away and is undetectable after a few openings.

It has now been surprisingly found that the olfactory effect of the fragrance can be considerably prolonged, such that it can still be detected after numerous openings and the passage of considerable time. There is therefore provided a method of extending the olfactory effect of a fragrance added to a washed item, comprising the addition to the wash of the fragrance, the fragrance comprising at least one compound selected from the group consisting of:

ethyl (Z)-2-acetyl-4-methyltridec-2-enoate;
ethyl N,S-bis(4-oxo-4-(2,6,6-trimethylcyclohex-3-en-1-yl)butan-2-yl)cysteinate;
4-(dodecylthio)-4-methylpentan-2-one;
1-butoxy-3-((1E,4Z)-hepta-1,4-dien-1-yl)benzene; and
2-ethoxy-4-((1E,4Z)-hepta-1,4-dien-1-yl)phenol.

The compound selected from the group hereinabove described (hereinafter simply referred to as "the compound") is a fragrance precursor, that is, under particular conditions such as exposure to humidity or oxygen, it will break down to release at least one fragrant material. Such compounds are described in, for example International Publications WO 2007/143873, WO 2018/096176 and WO 2012/085287. More than one such compound may be used.

In a particular embodiment, the compound comprises ethyl (Z)-2-acetyl-4-methyltridec-2-enoate. It may be used alone, or it may be combined with at least one of the other compounds named hereinabove.

That the use of such a compound or compounds would contribute to the provision of a fragrant odour under such circumstances is not surprising; that it would extend the life of the fragrance added to the wash is totally unexpected. Similarly, it is also totally unexpected that the presence of such a compound ensures that the full, original, olfactory effect of the fragrance endures for a time considerably longer than would otherwise be the case.

The prolongation effect is particularly noticeable when the washed item is stored in an enclosed, openable storage space, as hereinabove mentioned. The extent and nature of the prolongation effect varies, depending on the nature of the compound or compounds (more than one may be used) and the nature of the fragrance. The prolongation effect may in time from quite short to quite long, and from an olfactory point of view, from weak to strong. Typically, a washed item that was washed using a washing preparation utilizing a compound or compounds as hereinabove described and then stored in a closed, openable storage space, will still have a strong odour after 5-6 days of storage, and will last as long as 14 days. This contrasts with a washed item washed using a washing preparation not utilizing a compound or compounds as hereinabove described, in which the odour will be rather weak after 3 days of storage, and may not be at all perceptible. In addition, the compound-containing washed item will, after this time, retain a substantial part of the original olfactory character of the perfume, whereas the compound-lacking washed item will retain very little, and sometimes none at all.

The determination of a suitable formulation to provide any desired prolongation may be made by exercising the ordinary skill of the art, and, given the limited number of compounds hereinabove mentioned, this is not an overly burdensome endeavor.

The proportion of compound present in the fragrance will depend on the nature of the fragrance and the olfactory effect desired. Typically, it is present in a weight proportion of from 0.1 to 30%, although in particular cases, it is possible and permissible to use proportions outside these limits.

The fragrance may consist of any of those ingredients known to be useful in fragrance compositions. Typical, non-limiting examples of suitable ingredients include

- essential oils and extracts, e.g. castoreum, costus root oil, oak moss absolute, geranium oil, tree moss absolute, basil oil, fruit oils, such as bergamot oil and mandarine oil, myrtle oil, palmarose oil, patchouli oil, petitgrain oil, jasmine oil, rose oil, sandalwood oil, wormwood oil, lavender oil or ylang-ylang oil;
- alcohols, e.g. cinnamic alcohol, cis-3-hexenol, citronellol, Ebanol™, eugenol, farnesol, geraniol, Super Muguet™, linalool, menthol, nerol, phenylethyl alcohol, Rhodinol™, Sandalore™, terpineol or Timberol™.
- aldehydes and ketones, e.g. Azurone® (7-(3-methylbutyl)-1,5-benzodioxepin-3-one), anisaldehyde, alpha-amylcinnamaldehyde, Georgywood™, hydroxycitronellal, Iso E® Super, Isoraldeine®, Hedione®, 3-(4-isobutyl-2-methylphenyl)propanal, maltol, methyl cedryl ketone, methylionone, verbenone, or vanillin;
- ether and acetals, e.g. Ambrox®, geranyl methyl ether, rose oxide, or Spirambrene®;
- esters and lactones, e.g. benzyl acetate, cedryl acetate, γ-decalactone, Helvetolide®, γ-undecalactone or vetivenyl acetate;
- macrocycles, e.g. Ambrettolide, ethylene brassylate or Exaltolide®; and
- heterocycles, e.g. isobutylchinoline.

The fragrance formulation may also comprise normal ancillary materials, such as malodour counteractants, solvents and surfactants, present in art-recognised proportions.

The fragrance comprising the compound may be added individually to the wash near the end of the wash cycle, for example, as a fragrant rinse in a suitable solvent, or it may be incorporated into a washing product such as a fabric softener, tumble-dry sheet or powder or liquid detergent. In the latter case, the fragrance is added at a rate of from 0.3% to 2% by weight of the washing preparation.

In particular embodiments:

- ethyl (Z)-2-acetyl-4-methyltridec-2-enoate is added to fabric softener or to tumble-dry sheets at a weight proportion of up to 20%;

ethyl N,S-bis(4-oxo-4-(2,6,6-trimethylcyclohex-3-en-1-yl)butan-2-yl)cysteinate is added to high-density liquid and powder detergents and fabric conditioners at a weight proportion of up to 1%;

4-(dodecylthio)-4-methylpentan-2-one is added to high-density liquid detergents and fabric conditioners at a weight proportion of up to 5%.

The disclosure is further described with reference to the following example, which depicts particular embodiments and which are not intended to be in any way limiting.

Example: Basic Fragrance Suitable for Fabric Softener

| Compound/Inqredient | parts by weight 1/1000 |
|---|---|
| AGRUMEX (2-TERT-BUTYLCYCLOHEXYL ACETATE) | 30 |
| DODECANAL | 2 |
| 2-METHYLUNDECANAL | 1 |
| AMBROFIX (3A,6,6,9A-TETRAMETHYLDODECAHYDRONAPHTHO[2,1-B]FURAN) | 5 |
| BENZYL ACETATE | 20 |
| CASHMERAN (6,7-DIHYDRO-1,1,2,3,3-PENTAMETHYL-4(5H)-INDANONE) | 10 |
| CITRONELLOL | 40 |
| CYCLOGALBANATE (2-PROPENYL (CYCLOHEXYLOXY)ACETATE) | 5 |
| DAMASCONE DELTA (1-(2,6,6-TRIMETHYL-3-CYCLOHEXEN-1-YL)-2-BUTEN-1-ONE) | 10 |
| DIHYDRO MYRCENOL (2,6-DIMETHYL-7-OCTEN-2-OL) | 80 |
| ETHYL VANILLIN (3-ETHOXY-4-HYDROXYBENZALDEHYDE) | 15 |
| GARDENOL (1-PHENYLETHYL ACETATE) | 5 |
| GERANIOL (2-TRANS-3,7-DIMETHYL-2,6-OCTADIEN-1-OL) | 30 |
| GERANYL ACETATE (3,7-DIMETHYLOCTA-2,6-DIENYL ACETATE) | 15 |
| HEDIONE (METHYL 3-OXO-2-PENTYLCYCLOPENTANEACETATE) | 60 |
| HEXYL ACETATE | 15 |
| HEXYL CINNAMIC ALDEHYDE (2-HEXYL-3-PHENYL-2-PROPENAL) | 60 |
| HEXYL SALICYLATE (HEXYL 2-HYDROXYBENZOATE) | 90 |
| IONONE BETA (4-(2,6,6-TRIMETHYL-1-CYCLOHEXEN-1-YL)-3-BUTEN-2-ONE) | 15 |
| ISO E SUPER (2-ACETYL-1,2,3,4,5,6,7,8-OCTAHYDRO-2,3,8,8-TETRA-METHYLNAPHTALENE | 50 |
| JASMACYCLENE (3A,4,5,6,7,7A-HEXAHYDRO-4,7-METHANO-1-INDEN-5(6)-YL ACETATE) | 30 |
| JAVANOL[1)] | 5 |
| LAVANDIN GROSSO OIL | 30 |
| MANZANATE (ETHYL 2-METHYLPENTANOATE) | 4 |
| MEFROSOL (3-METHYL-5-PHENYL-1-PENTANOL) | 30 |
| METHYL ANTHRANILATE(METHYL 2-AMINOBENZOATE) | 5 |
| NEROLINE CRYSTALS (NAPHTALENE, 2-ETHOXY-) | 15 |
| NYMPHEAL (3-(4-ISOBUTYL-2-METHYLPHENYL)PROPANAL) | 20 |
| PATCHOULI OIL | 10 |
| PEACH PURE (4-UNDECANOLIDE) | 15 |
| PEONILE (2-CYCLOHEXYLIDENE-2-PHENYLACETONITRILE) | 40 |
| PETALIA (CYCLOHEXYLIDENE-O-TOLYL-ACETONITRILE) | 15 |
| PHENYL ETHYL ACETATE (2-PHENYLETHYL ACETATE) | 5 |
| PHENYL ETHYL ALCOHOL (2-PHENYLETHANOL) | 40 |
| RADJANOL[2)] | 30 |
| RASPBERRY KETONE (4-(4-HYDROXYPHENYL)-2-BUTANONE) | 5 |
| ROSE OXIDE (4-METHYL-2-(2-METHYL-1-PROPENYL)TETRAHYDRO-2H-PYRAN) | 3 |
| ROSYFOLIA ((1-METHYL-2-(5-METHYLHEX-4-EN-2-YL)CYCLOPROPYL)METHANOL) | 10 |
| TRICYCLAL (2,4-DIMETHYL-3-CYCLOHEXENE-1-CARBALDEHYDE) | 5 |
| UNDECAVERTOL (4-METHYL-3-DECEN-5-OL) | 15 |
| DIPROPYLENE GLYCOL | 110 |
| Total: | 1000 |

[1)]Javanol = ((1-METHYL-2-(1,2,2-TRIMETHYLBICYCLO(3.1.0)-HEX-3-YLMETHYL)-CYCLOPROPYL)METHANOL)
[2)]Radjanol = 2-ETHYL-4-(2,2,3-TRIMETHYL-3-CYCLOPENTEN-1-YL)-2-BUTEN-1-OL 1) Javanol=((1-METHYL-2-(1,2,2-TRIMETHYLBICYCLO(3.1.0)-HEX-3-YLMETHYL)-CYC LOPROPYL)METHANOL)

2) Radjanol=2-ETHYL-4-(2,2,3-TRIMETHYL-3-CYCLOPENTEN-1-YL)-2-BUTEN-1-OL

This accord gave a fresh floral fruity character on neat product, and wet and dry fabric Two samples of this fragrance formula were modified by replacement of the dipropylene glycol (DPG) solvent by identical weights of (i) ethyl (Z)-2-acetyl-4-methyltridec-2-enoate, and (ii) a mixture of ethyl (Z)-2-acetyl-4-methyltridec-2-enoate (6 parts), ethyl N,S-bis(4-oxo-4-(2,6,6-trimethylcyclohex-3-en-1-yl)butan-2-yl)cysteinate (4 parts) and 4-(dodecylthio)-4-methylpentan-2-one (1 part).

The fragrance formulae thus modified were designated B and C, respectively.

The three fragrances were each added to a sample of a unfragranced fabric softener base at a proportion of 1% by weight of the fabric softener base. The fabric softener with the unmodified fragrance was designated Fabsoft A. The other two were designated Fabsoft B and Fabsoft C, to match the modified fragrances added thereto. Samples of the fragrances were retained for purposes of comparison.

The fabric softeners were prepared one day prior to testing.

The washing load in each case consisted of one towel (100% cotton), one T-shirt (95% cotton and 5% Elasthane™ polyether-urea) and one sport T-shirt (100% synthetic).

The washing cycle was one of 18 minutes and a spin of 1200 rpm.

At the end of the various cycles, the washed items were removed and dried initially for one day on a clothes line. They were then put in boxes to emulate storage in a cupboard or drawer and tested after 6 days' storage by trained perfumers. The perfumers assessed the intensity of the odour on a scale of from 0 (weak) to 5 (very strong), and also the olfactory qualities in comparison with the original fragrances.

The results were as follows:

| | Odour Intensity | Odour character |
|---|---|---|
| Fabsoft A | 2 | Weak, only slight hint of original fragrance |
| Fabsoft B | 4.5 | Fresh, strong, aldehydic, clear presence of original fragrance |
| Fabsoft C | 4 | Floral, fruity, aldehydic |

Both of the samples utilizing the compounds were not only stronger in odour, but also retained more of the characteristics of the original fragrances, the single compound fragrance (B) slightly outperforming the mixture (C). In contrast, the sample containing the unmodified fragrance was not only weakly discernible, but also had lost most of the original olfactory character.

The invention claimed is:

1. A method of extending the olfactory effect of a fragrance added to a washed item, the method comprising adding a fragrance composition to a wash, the fragrance composition comprising at least two compounds selected from the group consisting of:

a) ethyl (Z)-2-acetyl-4-methyltridec-2-enoate;

b) ethyl N,S-bis(4-oxo-4-(2,6,6-trimethylcyclohex-3-en-1-yl)butan-2-yl)cysteinate;

c) 4-(dodecylthio)-4-methylpentan-2-one;

d) 1-butoxy-3-((1E,4Z)-hepta-1,4-dien-1-yl)benzene; and e) 2-ethoxy-4-((1E,4Z)-hepta-1,4-dien-1-yl)phenol.

2. The method according to claim 1, in which the at least two compounds are present in the fragrance in an amount of from 1-30% by weight.

3. The method according to claim 1, in which the fragrance composition further comprises a suitable solvent.

4. The method according to claim 1, in which the fragrance composition is added as part of a washing composition.

* * * * *